Sept. 3, 1957 H. J. HAMILTON 2,805,408

MAGNETIC PERMANENT STORAGE

Filed April 28, 1955 4 Sheets-Sheet 1

INVENTOR.
HAROLD J. HAMILTON

BY Theodore H. Lassagne

ATTORNEY

Sept. 3, 1957 H. J. HAMILTON 2,805,408
MAGNETIC PERMANENT STORAGE
Filed April 28, 1955 4 Sheets-Sheet 2
FIG. 2
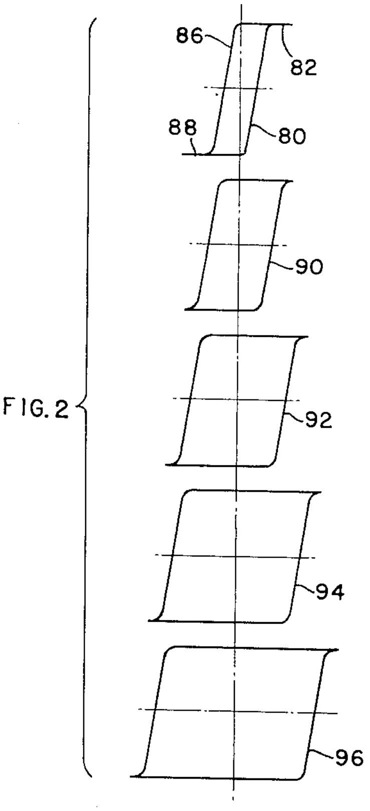
FIG. 4
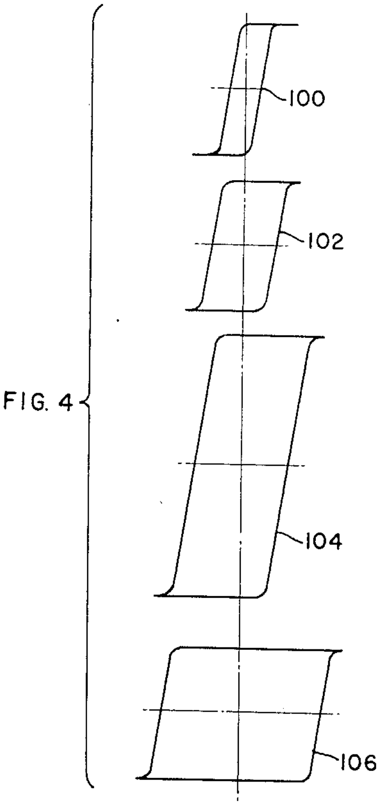
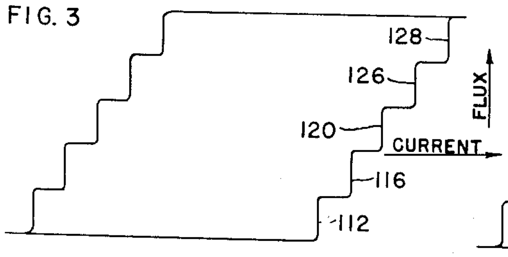
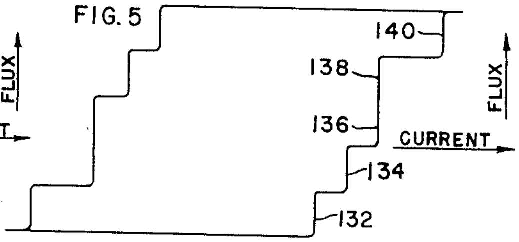
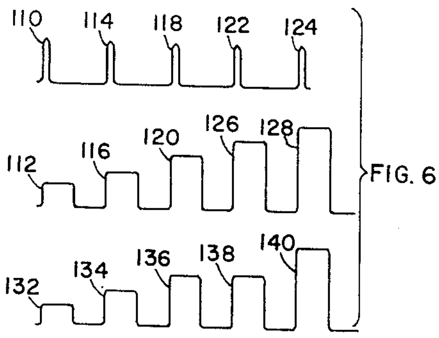
FIG. 6
*INVENTOR.*
HAROLD J. HAMILTON
*BY* Theodore H. Lassagne
ATTORNEY

*INVENTOR.*
HAROLD J. HAMILTON
*BY* Theodore H. Lassagne
ATTORNEY

Sept. 3, 1957 H. J. HAMILTON 2,805,408

MAGNETIC PERMANENT STORAGE

Filed April 28, 1955 4 Sheets-Sheet 4

INVENTOR.
HAROLD J. HAMILTON
BY
Theodore H. Lassagne
ATTORNEY 2,805,408

MAGNETIC PERMANENT STORAGE

Harold J. Hamilton, Glendale, Calif., assignor to Librascope, Incorporated, Glendale, Calif., a corporation of California Application April 28, 1955, Serial No. 504,464

11 Claims. (Cl. 340—174)

This invention relates to an information member for digital computers or data processing apparatus and more particularly to an information member for providing a plurality of signals representing such information as different members.

In recent years a number of computers and data processing systems have been built which utilize digital techniques. In these computers, numbers are represented by pluralities of signals, each signal in a plurality representing a part of the total number. For example, a decimal number such as "43" may be represented in binary form by a plurality of sequentially emitted signals presented in the order 101011, the least significant digit, first emitted, being at the right.

Various types of apparatus have been used to obtain pluralities of signals representing different numbers in digital form. In many digital computers now in use, the different digits in a multi-digital number are represented magnetically. One type of magnetic representation which is coming widely into use is obtained by utilizing for successive digits separate magnetic cores having saturable properties. Each core is adapted to represent the value "1" or the value "0" by different levels of magnetism in the core.

It has been difficult to use the cores for providing fixed values. These fixed indications are often desirable when such values as constants, sines, cosines, tables and empirical data are to be represented. Furthermore, since separate magnetic cores have had to be used for each digit in a multi-digital number, the total number of cores in a complete digital computer has been relatively large. Even though each core in itself is relatively small, the total space occupied by all of the cores has been relatively large. Each core has also required separate windings to write magnetic information into the core and to subsequently read the magnetic information in the core. Because of this, such core "memories" have been relatively expensive.

This invention provides a novel and compact information storing device formed from a plurality of saturable magnetic cores, each of which has a different size relative to that of the other cores. The magnetic fluxes in the various cores, therefore, have different lengths to travel, and offer different impedances to the flow of current through windings magnetically coupled to the cores. These differences in current are used to produce sequences of output signals when the currents are compared to the currents produced by a reference member, which is also formed from a plurality of cores.

In an improved embodiment of the invention, a plurality of saturable cores are disposed in co-planar relationship with one another, conserving space, and a single winding is magnetically coupled to all of the co-planar cores, minimizing cost. Because of the different characteristics provided for the various cores, each core limits the current flowing through the winding at a different amplitude until the core becomes saturated. This prevents more than one core from becoming saturated in any one clock signal when successive clock signals are applied to the cores. In this way, the different cores become saturated, one at a time, upon the introduction of successive clock signals to the winding. Since each core provides a different limit until its saturation on the current flowing through the winding, different patterns of current can be produced in the winding by varying the characteristics of the different cores. In this way, any value desired can be represented digitally by the current pattern in the winding.

The invention is especially adapted to be used to represent fixed numerical values. For example, a plurality of non-magnetic rings may be provided such that the rings may be adapted to fit within one another in telescoped relationship. Layers of saturable magnetic material may be disposed on some of the rings and the other rings may be left bare in accordance with the pattern of signals desired. When clock signals are applied in sequence to the winding, the winding produces successive current signals in accordance with the pattern of the magnetic and non-magnetic peripheries of successive rings.

In the drawings:

Figure 2 is a family of curves, each curve indicating the magnetic changes occurring in a different element of the reference portion forming a part of the embodiment shown in Figure 1;

Figure 3 illustrates a typical composite curve obtained by combining the family of curves shown in Figure 2;

Figure 4 is a family of curves, each curve indicating the magnetic changes occurring in a different element of the information portion forming a part of the embodiment shown in Figure 1;

Figure 5 shows a composite curve obtained by combining the family of curves shown in Figure 4 and illustrates by comparison with Figure 4 the pattern of output signals which can be produced;

Figure 6 is a group of curves illustrating a plurality of output signals and the time relationship between the output signals, such output signals being obtained by the reference and information portions of the embodiment shown in Figure 1 when the embodiment operates in a manner represented by the curves shown in Figures 2 to 5, inclusive;

Figure 7:
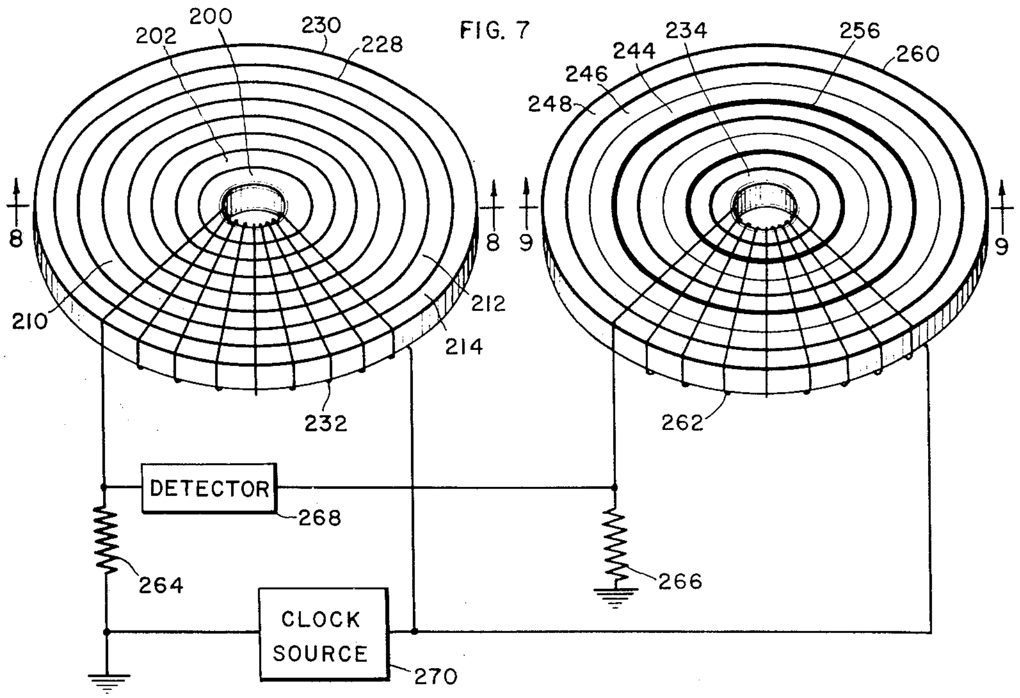
Figure 7 is a view, partly in perspective and partly in block form, of an improved embodiment of the invention and includes a perspective view of a first plurality of co-planar cores constituting a reference portion and a perspective view of a second plurality of co-planar cores constituting an information portion.
Figure 8:
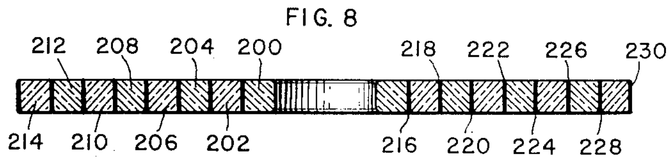
Figure 8 is an enlarged sectional view substantially on the line 8—8 of Figure 7 and illustrates in further detail the reference portion forming a part of the embodiment shown in Figure 7.
Figure 9:
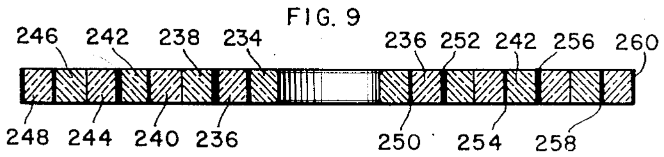
Figure 9 is an enlarged sectional view substantially on the line 9—9 of Figure 7 and illustrates in further detail the information portion forming a part of the embodiment shown in Figure 7.
Figure 10:
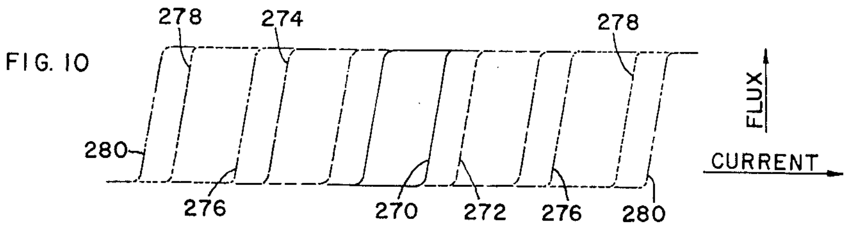
Figure 10 is a family of curves, each curve indicating the magnetic changes occurring in a different element of the information portion shown in Figures 7 and 9.
Figures 11, 12:
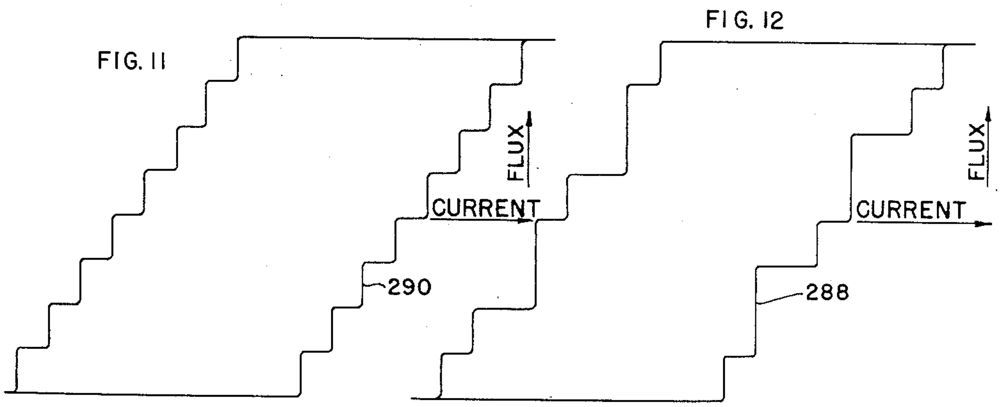
Figure 11 illustrates a typical composite curve, similar to that shown in Figure 2, illustrating the magnetic characteristics of the reference portion shown in Figures 7 and 8.
Figure 13:
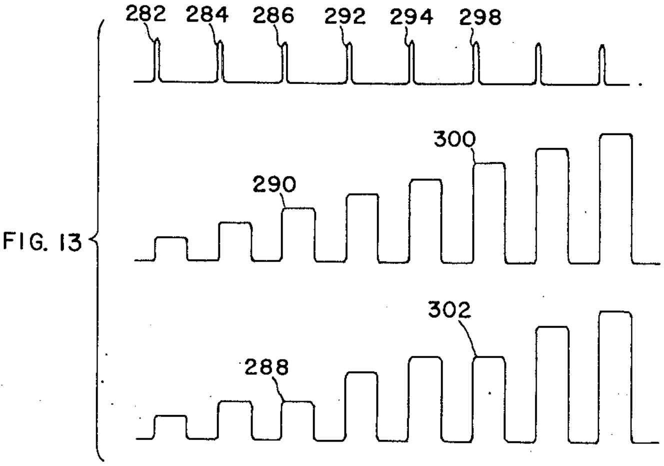

Figure 12 illustrates a typical composite curve, similar to that shown in Figure 11, illustrating the magnetic characteristics of the information portion shown in Figures 7 and 9; and Figure 13 is a group of curves illustrating a plurality of output signals and the time relationship between the output signals, such output signals being obtained by the reference and information portions of the embodiment shown in Figures 7, 8 and 9 when the embodiment operates in a manner represented by the curves shown in Figures 10, 11 and 12.

The objects and advantages of the invention, in the broadest sense, may be achieved by the employment of seperate cores in both a reference portion and an information storing portion of the device of the present invention, with a separate winding for each such core. In this arrangement, the separate windings of the reference cores would be connected in series with each other and likewise the separate windings of the information storing core series would be connected in series with each other.

A further object and advantage of the present invention, however, is the structural simplification of the device which is made possible by the telescoped arrangement of the cores of each of the two respective series as disclosed in the drawings. When such an arrangement is employed, it has been found that a single winding suffices for each series of cores, and that when constructed with such a single winding there is less likely to be a disparity between the volt-seconds input to the several cores of each series than if a separate winding for each core is employed. The "single winding" arrangement is therefore to be regarded as an improvement on, as distinguished from an equivalent of, the "separate winding" arrangement.

Figure 1:
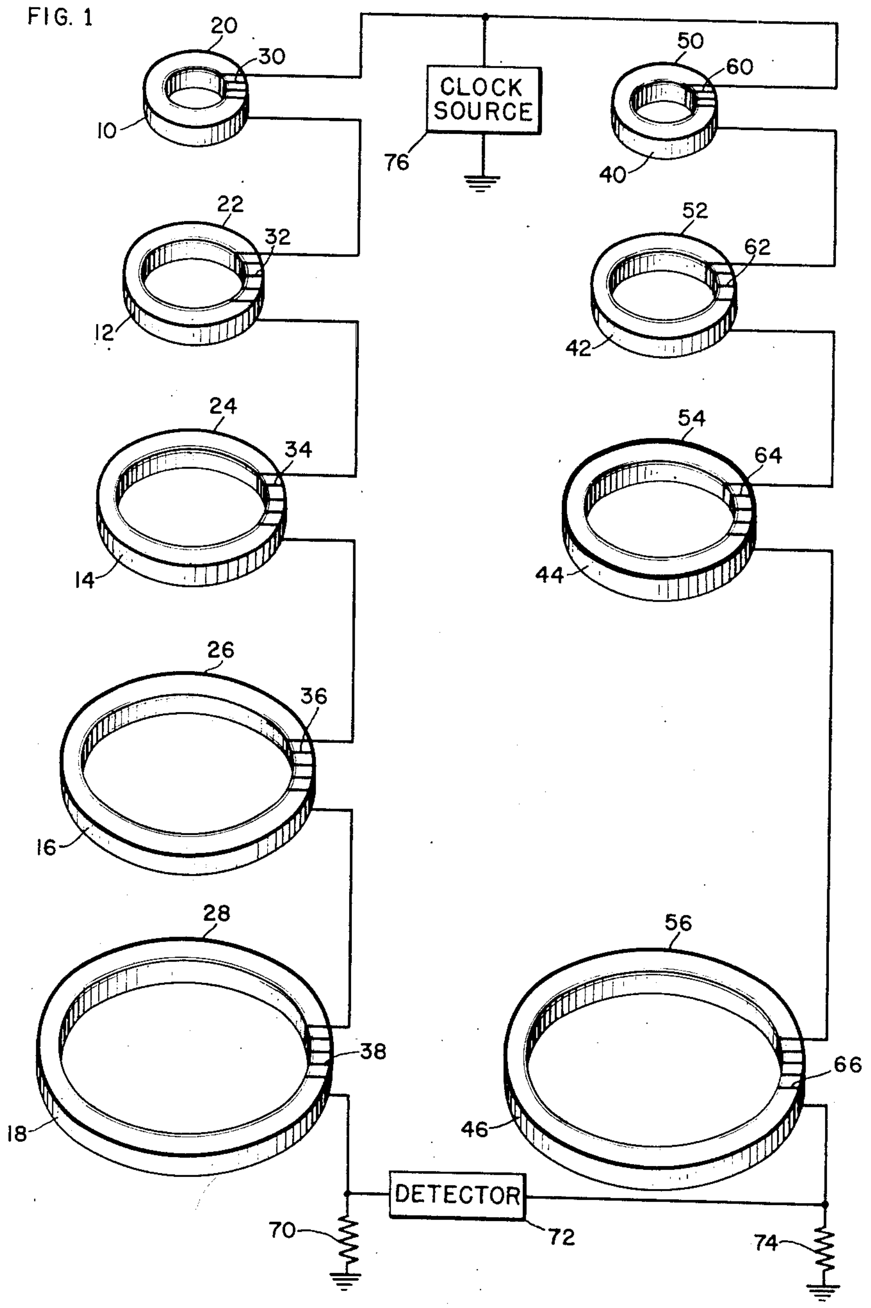
Figure 1 is a view, partly in perspective and partly in block form, of one embodiment of the invention and includes a first plurality of cores constituting a reference portion and a second plurality of cores constituting an information portion.

In Figure 1, an embodiment is shown which employs separate cores and separate windings on each core as a reference portion. The cores are provided on the peripheries of certain non-magnetic retaining members such as rings 10, 12, 14, 16 and 18. Each of the rings 10, 12, 14, 16 and 18 is made from a non-magnetic material having good properties of electrical insulation such as a ceramic. The rings 10, 12, 14, 16 and 18 are preferably toroidal, but other suitable configurations may be used. Each of the rings 12, 14, 16 and 18 has an outer periphery which is greater in diameter than the outer periphery of the rings, 10, 12, 14 and 16, respectively.

Cores of magnetic material 20, 22, 24, 26 and 28 are respectively disposed on the rings 10, 12, 14, 16 and 18. The cores of magnetic material may be disposed on the respective peripheries of the rings as by evaporating a film of particles such as "Mo-Permalloy" or iron oxide on the periphery of each of the rings or by wrapping a magnetic tape around the periphery of each ring. Each core of magnetic material extends in a substantially uniform thickness around the associated ring and has a suitable thickness such as a few thousandths of an inch.

A plurality of windings 30, 32, 34, 36 and 38 are respectively disposed in magnetic proximity to the rings 10, 12, 14, 16 and 18. Each of the windings 30, 32, 34, 36 and 38 may be formed from a single conductor which extends through a central hole in its associated ring. Or, as shown in the drawings, each winding may be formed from a plurality of turns which loop its associated ring. The windings 30, 32, 34, 36 and 38 are in series with one another.

The information storing portion shown in Figure 1 includes a plurality of non-magnetic rings 40, 42, 44 and 46 corresponding in size to the rings 10, 12, 14 and 18, respectively. The rings 40, 42, 44 and 46 may be made from the same material as the rings 10, 12, 14 and 18. Cores 50, 52 and 56 of saturable magnetic material are disposed on the rings 40, 42, and 46 and are provided with properties corresponding substantially to the cores 20, 22 and 28. A core 54 of saturable magnetic material is disposed on the ring 44 and is provided with a thickness substantially twice as great as that of the core 24 on the ring 14. A plurality of windings 60, 62, 64 and 66 are disposed in magnetic proximity to the cores 50, 52, 54 and 56 in a manner similar to that described above for the windings 30, 32, 34, 36 and 38.

Sensing means are also included in the embodiment shown in Figure 1. The sensing means includes a resistance 70 having one terminal grounded and the other terminal connected to the winding 38. The ungrounded terminal of the resistance 70 is connected to a detector 72. The detector 72 is also connected to the ungrounded terminal of a resistance 74 in series with the windings 60, 62, 64 and 66. The detector 72 may be formed from two similar circuits balanced to ground such that the output from the two balanced circuits represents any difference in the voltages from the circuits.

A clock source 76 is connected to the windings 30 and 60 to energize the group of windings 30, 32, 34, 36 and 38 and the group of windings 60, 62, 64 and 66. The source 76 may be a relaxation oscillator or any other type of circuit which is adapted to provide pulses at periodic intervals. Alternatively, however, clock signals may be obtained, in digital computers, from such a source as a magnetic drum.

Because of the particular magnetically saturable material from which the cores are made, each of the cores on its periphery has a response represented by a hysteresis curve similar to those shown in Figure 2. For example, as will be seen at 80 in Figure 2, an initial imposition of positive current in the winding 30 causes the magnetic flux in the core 20 to rise rapidly at the beginning from its negative saturation value. Since the flux changes rapidly, the impedance initially presented by the winding 30 because of the presence of the layer 20 is relatively high. Continued imposition of current, or an increase in the magnitude of the current flowing through the winding 30, causes the layer 20 to become saturated with flux of a positive polarity, as indicated at 82 in Figure 2. When the core 20 becomes saturated with magnetic flux, relatively little additional flux change is produced in the core even when the current flowing through the winding 30 is increased.

The core such as the core 20 on the ring 10 acts in a manner similar to that described above when current of a negative polarity flows through the winding 30 after saturating flux of a positive polarity has been produced in the core. Thus, the flux changes rapidly at the beginning, as illustrated at 86, and subsequently becomes relatively stable, as indicated at 88, even when the magnitude of the current flowing through the winding is increased.

As will be seen in Figure 2, each core of magnetic material in the reference portion and in the information portion has a saturable hysteresis curve. For example, the core 20 on the ring 10 has magnetic characteristics illustrated by the hysteresis curve described above and shown in Figure 2. Similarly, the cores 22, 24, 26 and 28 have hysteresis curves respectively illustrated at 90, 92, 94 and 96 in Figure 2. The cores 50, 52, 54 and 56 also have hysteresis curves 100, 102, 104 and 106, respectively, as shown in Figure 4.

It is usual to express the ordinate or vertical axis of the hysteresis loop in terms of flux density or gausses. This value is, however, directly proportional to the number of volt-seconds per turn of winding per square centimeter of core cross-sectional area. Therefore, for any given cross-sectional area of the core and any given number of winding turns, the ordinate value may be expressed in volt-seconds. The volt-seconds required to change the magnetic state of a core from positive saturation to negative saturation, or vice versa, will, of course, vary according to the cross-sectional area of the core and the magnetic material of which it is made, and may be conveniently referred to as the "volt-seconds capacity" of the core.

The particular configurations of the different hysteresis curves are dependent upon certain parameters such as the particular material used. The particular configurations are also dependent upon the mean path length which the fluxes in the different layers must follow. This is in turn proportional to the radii of the different rings such as the cores 10, 12, 14, 16 and 18.

By maintaining substantially constant the parameters for the different cores of magnetic material and varying only the radii of the different cores, the longitudinal widths of the hysteresis curves such as the curves 90, 92, 94 and 96 can be made substantially proportionate to the radii of the layers. Since the peripheral length of each core such as the cores 20, 22, 24, 26 and 28 is substantially proportional to the current required to produce saturation of the layer, it will be seen that the current is different for each layer. The longitudinal widths of the hysteresis curves can also be varied by adjusting certain other parameters such as materials from which the different cores are made.

The different hysteresis curves shown in Figures 2 and 4 can be respectively combined into composite hysteresis curves similar to those shown in Figures 3 and 5. Since the composite curve shown in Figure 3 is perhaps easier to understand than the composite curve shown in Figure 5, the curve shown in Figure 3 will be explained first. The curve shown in Figure 3 is produced by the reference portion of the embodiment shown in Figure 1.

When a first clock signal illustrated at 110 in Figure 6 is applied from the source 76 to the windings 30, 32, 34, 36 and 38, current flows through the windings. This current has a relatively limited magnitude because of the high magnetic impedance presented by the core 20 on the ring 10. The current is limited to a value such as that indicated at 80 in Figure 2 since the core 20 on the ring 10 inhibits any increased flow of current until the core 20 becomes saturated with magnetic flux. The value 80 in Figure 2 corresponds to a value 112 in Figures 3 and 6. By matching the characteristics of the clock signals and the core 20 so that the volt-seconds capacity of the core equals the volt-seconds output of the clock during each pulse time, the core 20 can be saturated with magnetic flux substantially at the end of the first clock signal.

Upon the imposition of a second clock signal illustrated at 114 in Figure 6, an increased current flows through the windings 30, 32, 34, 36 and 38. This results from the fact that the core 20 presents a low impedance to the flow of current since it has already been saturated. Since the core 20 is saturated, the core 22 acts to limit the current flowing through the windings 30, 32, 34, 36 and 38 to a value indicated at 116 in Figures 3 and 6 and corresponding to that represented by the hysteresis curve 90 in Figure 2. This current is somewhat greater than the current 112 obtained in the windings 30, 32, 34, 36 and 38 during the first clock pulse. At the end of the clock pulse 114, the core 22 becomes saturated with magnetic flux because of the match in characteristics between the clock pulse and the saturable properties of the layer.

The imposition of a third clock pulse 118 in Figure 6 causes a current indicated at 120 in Figures 3 and 6 to flow through the windings 30, 32, 34, 36 and 38. This current is limited to the value 120 by the impedance presented by the core 24 of magnetic material. At the end of the clock pulse 118, the core 24 becomes saturated in a manner similar to that described above for the cores 22 and 24.

In like manner, the layers 26 and 28 successively limit the current flowing through the windings 30, 32, 34, 36 and 38 upon the introduction of successive clock signals 122 and 124. The current flowing through the windings upon the introduction of successive clock signals is illustrated at 126 and 128 in Figures 3 and 6. At the end of each of the clock signals 122 and 124, successive ones of the cores 26 and 28 become saturated.

As will be seen in Figures 3 and 6, the current flowing through the windings 30, 32, 34, 36 and 38 increases in a progressive and steplike pattern when successive clock signals are introduced to the winding. Since the current flowing through the windings 30, 32, 34, 36 and 38 also flows through the resistance 70 in Figure 1, the voltage produced across the resistance increases on a step basis in accordance with the introduction of successive clock signals. This stepwise increase in the voltage across the resistance 70 is illustrated by the signals 112, 116, 120, 126 and 128 in Figure 6.

The information portion shown in Figure 1 operates in a manner similar to that described above. Upon the introduction of the first clock 110 to the windings 60, 62, 64 and 66, current illustrated at 132 in Figures 5 and 6 flows through the windings and saturates the core 50 at the end of the clock signal. The current 132 corresponds in amplitude to the current 112 in Figures 3 and 6 and produces a voltage across the resistance 74 corresponding in magnitude to the voltage simultaneously produced across the resistance 70. Since the voltages across the resistances 70 and 74 are equal, substantially no output voltage is produced across the detector 72. The lack of an output voltage from the detector 72 at the time of a clock signal indicates a value of "0" or a "false" state.

When the second clock signal 114 is introduced to the windings 60, 62, 64 and 66, current having a magnitude illustrated at 134 in Figures 5 and 6 flows through the windings. This current corresponds in amplitude to the current 116 in Figures 3 and 6 and produces across the resistance 74 a voltage corresponding to the voltage simultaneously produced across the resistance 70. Since the voltages across the resistances 70 and 74 are substantially equal, no output voltage is obtained from the detector 72. As described above, this corresponds to a value of "0" or a false state.

The current flowing through the windings 60, 62, 64 and 66 upon the introduction of the third clock signal is limited by the impedance presented by the winding 64. This results from the fact that the saturation of the cores 50 and 52 causes the impedance presented by the windings 60 and 62 to be relatively low. The resultant current flowing through the windings 60, 62, 64 and 66 is indicated at 136 in Figures 5 and 6. Since the current 136 is substantially equal in magnitude to the current 120 simultaneously flowing through the resistance 70, no output signal is produced by the detector 72. This causes a value of "0" or a "false" state to be represented.

Since the core 54 has substantially twice the thickness of the cores 50 and 52, it does not become saturated with magnetic flux at the end of the clock pulse 118. Because of the unsaturated state of the core 54, the core continues to limit the current flowing through the windings 60, 62, 64 and 66 upon the introduction of the fourth clock signal 122. This current has a magnitude 138 substantially equal to the magnitude 136, as shown in Figures 5 and 6. The current 138 is discriminatorily less in amplitude than the current 126 simultaneously flowing through the windings 30, 32, 34, 36 and 38. This causes the resistance 74 to produce a voltage having an amplitude less than the voltage simultaneously produced across the resistance 70. The difference in voltages across the resistances 70 and 74 is detected by the detector 72 so that an output voltage is produced across the detector. The output voltage from the detector 72 represents a value of "1" or a "true" state at the fourth clock signal.

At the end of the fourth clock signal 122, the core 54 becomes saturated with magnetic flux. This causes the current flowing through the windings 60, 62, 64 and 66 to be limited by the impedance presented by the winding 66 upon the occurrence of the fifth clock pulse 124. The resultant current flowing through the windings 60, 62, 64 and 66 is indicated at 140 in Figures 5 and 6 and is substantially equal to the current 128 flowing through the windings 30, 32, 34, 36 and 38. Because of this, no output signal is produced by the detector 72 in representation of a value of "0" or a "false" state.

In this way, output signals are produced by the detector 72 in the order of 01000 upon the occurrence of successive clock signals, where the least significant digit is at the right. Such a binary configuration corresponds to a decimal value of "8." In like manner, sequences of signals having any binary configuration and representing any decimal value can be produced in information members similar to those shown in Figure 1.

Figures 7, 8 and 9 show an improved embodiment of the apparatus illustrated in Figure 1 and described above. As in Figure 1, the emobdiment shown in Figures 7, 8 and 9 includes a reference portion, an information portion and sensing means associated with the reference and information portions.

The reference portion is formed from a plurality of non-magnetic rings 200, 202, 204, 206, 208, 210, 212 and 214 which are preferably toroidal in shape. The outer diameter of each of the rings 202, 204, 206, 208, 210, 212 and 214 is preferably slightly smaller than the inner diameter of each of the rings 200, 202, 204, 206, 208, 210 and 212, respectively. In this way, the rings are able to fit within one another so that the cores are disposed in coplanar relationship in the resultant assembly. By disposing the rings in such telescopic relationship to one another, the space occupied by the rings is considerably less than they otherwise would be.

Saturable magnetic cores 216, 218, 220, 222, 224, 226, 228 and 230 are respectively provided on the rings 200, 202, 204, 206, 208, 210, 212 and 214 in a manner similar to that described above for the cores shown in Figure 1. The thickness of each of the cores 216, 218, 220, 222, 224, 226, 228 and 230 is uniform and equal to that of the other cores. A winding 232 is disposed on the above assembly so that its turns loop around the inner portion of the ring 200 and the outer portion of the ring 214.

The information portion of the embodiment shown in Figures 7, 8 and 9 includes a plurality of rings 234, 236, 238, 240, 242, 244, 246 and 248. These rings are respectively similar in dimensions to the rings 200, 202, 206, 208, 210, 212 and 214 described above. Cores 250, 252, 254, 256, 258 and 260 are respectively disposed on the peripheries of the rings 234, 236, 240, 242, 246 and 248. The cores 250, 254, 258 and 260 have thicknesses corresponding to the thicknesses of the cores 216, 218, 220, 222, 224, 226, 228 and 230. The cores 252 and 256 have thicknesses substantially twice as great as those of the cores 250, 254, 258 and 260. A winding 262 is disposed on the rings 234, 236, 238, 240, 242, 244, 246 and 248 in a manner similar to that described above for the winding 232.

The sensing means include a pair of grounded resistances 264 and 266 each having an ungrounded terminal respectively connected to the windings 232 and 262. The resistances 264 and 266 correspond to the resistances 70 and 74, respectively, in Figure 1. The ungrounded terminals of the resistances 264 and 266 are also connected to a detector 268, which corresponds to the detector 72 in Figure 1. A clock source 270 similar to the clock source 76 in Figure 1 is connected to the windings 232 and 262 to supply signals to the windings.

Since the flux produced in each core travels in a closed loop around the core, the flux produced in each core does not link any of the other cores even though the cores are disposed in telescoped relationship. This causes the cores on the reference and information portions shown in Figures 7, 8 and 9 to have saturable magnetic characteristics similar to those described above for the embodiment shown in Figure 1. These saturable magnetic characteristics are represented by hysteresis curves 270, 272, 274, 276, 278 and 280 in Figure 10 for the cores 250, 252, 254, 256, 258 and 260, respectively. The hysteresis curves 270, 272, 274, 276, 278 and 280 can be combined into a composite hysteresis curve shown in Figure 12. Similarly, the hysteresis curves representing the difference cores in the reference portion can be combined into the hysteresis curve shown in Figure 11.

As will be seen by the composite hysteresis curves shown in Figures 11 and 12, the cores 216 and 250 limit the currents through the windings 232 and 262 to substantially equal values upon the introduction of a first clock signal 282. In like manner, the cores 218 and 252 limit the currents through the windings 232 and 262 to substantially equal values upon the introduction of a second clock signal 284. Because of the substantially equal currents during each of the first and second clock signals, no output signals are produced by the detector 268, causing values of "0" or a "false" state to be indicated by the detector.

Since the core 252 is substantially twice as thick as most of the other cores, it does not become saturated at the end of the second clock signal 284. Thus, it continues to limit the current flowing through the winding 262 when a third clock signal 286 is introduced to the winding. This current is illustrated at 288 in Figures 12 and 13. However, a current 290 greater in amplitude than the current 288 flows at the same time through the winding 232. The current 290 is greater than the current 288 since the current 290 is limited by the core 220 and not by the core 218, which became saturated at the end of the second clock signal 284. Because of the difference in the amplitudes of the currents 288 and 290, an output signal is produced by the detector 268 to represent a value of "1" or a "true" state.

At the end of the third clock signal, the cores 220 and 252 become saturated. This causes the currents through the windings 232 and 262 to be limited by the cores 222 and 254. Since these cores have substantially identical characteristics, the detector 268 provides an indication of "0" or a "false" state for a fourth clock pulse 292. The detector 268 also provides an indication of "0" upon the introduction of a filth clock pulse 294 since the cores 224 and 254 provide identical characteristics in limiting the currents through the windings 232 and 262.

Because of its double thickness, the core 258 does not become saturated at the end of the fifth clock pulse. This causes unequal currents to flow through the windings 232 and 262 upon the introduction of a sixth clock pulse 298, the current 300 through the winding 232 being greater than the current 302 through the winding 262. This difference in the amplitudes of the currents 300 and 302 causes an output signal to be produced by the detector 268 in representation of a value "1" or a "true" state.

Values of "0" are indicated by the detector 268 when seventh and eighth clock pulses are introduced to the windings 232 and 262. In this way, output signals in the order of 00100100 are produced in the detector 268, where the least significant digit is at the right. This corresponds to a decimal value of "36." As described above, the cores in the information portion can be arranged to produce a sequence of signals representing any other decimal value.

By using information portions having different configurations of magnetic cores, various functions can be produced. For example, trigonometric functions such as sines and cosines can be obtained by providing a plurality of rings having radii different from one another in a particular relationship and by providing magnetic cores on the peripheries of certain of the rings in accordnace with the function desired. Other functions such as hyperbolic functions and empirical curves can also be obtained.

It should be appreciated that one reference portion can be used with a plurality of different information portions. The reference portions can be similar to that shown in Figure 1 or to that shown in Figures 7 and 8. It should also be appreciated that other types of reference memory members can be used in addition to that shown in Figures 5 and 6 and described above. For example, a reference portion can be employed having a single non-magnetic ring and having a plurality of cores of magnetic material disposed radially on the ring. Each of the cores may have a lower reluctance than the previous core. In this way, when each core becomes saturated with magnetic flux, an increased current flows through the winding to saturate the next core. This causes a composite hysteresis curve to be produced corresponding to that shown in Figure 11. It is also conceivable that the standard core member can be eliminated entirely. This might be accomplished by producing a trapezoidal signal and by comparing the voltage across the resistance 266 in Figure 7 with the amplitude of the trapezoidal signal upon the occurrence of each successive clock signal.

The memory member disclosed above has certain important advantages. In one embodiment, it includes a plurality of cores providing different pehipheral lengths for the travel of magnetic flux to represent a fixed value or fixed values. In an improved embodiment, it includes a plurality of cores telescoped into coplanar relationship. The improved embodiment is capable of producing a plurality of ouput signals even though it occupies a space no larger than that required by single cores now in use. Furthermore, in the improved embodiment only one winding is required to serve a plurality of cores. This causes savings in time and material to be obtained by minimizing the number of windings required. The memory member operates reliably to produce output signals of any desired pattern.

The embodiments constituting this invention are further advantageous in that they retain the desired information even after power failures or power shutdowns. This results from the fact that the particular sequence of signals are produced by the embodiments of the invention because of the physical characteristics provided for the different members forming the embodiments. Since machines such as computers and data processing systems are often shut down to program new problems into the machines, the retention of fixed information by the use of this invention can be quite important.

What is claimed is:

1. An information storing and emitting device including a reference portion comprising a first series of cores of respectively identical volt-seconds capacities, the magnetic field strength requirements of said first series of cores increasing progressively from core to core, and a first winding common to said first series of cores; an information storing portion comprising a second series of cores of respectively differing volt-seconds capacities conforming with a pattern representing information to be stored therein; the magnetic field strength requirements of said second series of cores increasing progressively from core to core, and a second winding common to said second series of cores; means for simultaneously pulsing said windings with discrete pulses the volt-seconds integral of each of which equals the volt-seconds capacity of each core in said first series; and a sensing device including means responsive to impedance differences in said windings for emitting a signal only when the impedance of said windings during the operation of said pulsing means is discriminably different.

2. An information storing and emitting device including a reference portion comprising a first series of cores of respectively identical volt-seconds capacities; the magnetic field strength requirements of said first series of cores increasing progressively from core to core, and a first winding common to said first series of cores; an information storing portion comprising a second series of cores of respectively differing volt-seconds capacities conforming with a pattern representing information to be stored therein; the magnetic field strength requirements of said second series of cores increasing progressively from core to core, and a second winding common to said second series of cores; means for simultaneously pulsing said windings with discrete pulses the volt-seconds integral of each of which equals the volt-seconds capacity of each core in said first series; and a sensing device including means responsive to the currents flowing in said respective windings for emitting a signal only when the currents flowing through the respective windings during operation of said pulsing means are discriminably different.

3. An information storing and emitting device including a reference portion comprising a first series of cores of respectively identical volt-seconds capacities, the magnetic field strength requirements of said first series of cores increasing progressively from core to core, and a first conductor common to said first series of cores and so juxtaposed therewith as to impose substantially equal flux densities thereon when said conductor is energized; an information storing portion comprising a second series of cores of respectively differing volt-seconds capacities conforming with a pattern representing information to be stored therein; the magnetic field strength requirements of said second series of cores increasing progressively from core to core, and a second conductor common to said second series of cores and so juxtaposed therewith as to impose substantially equal flux densities thereon when said conductor is energized; means for simultaneously pulsing said conductors with discrete pulses, the volt-seconds integral of each of which equals the volt-seconds capacity of each core in said first series; and a sensing device including means responsive to the currents flowing in said respective conductor for emitting a signal only when the currents flowing through the respective conductor during operation of said pulsing means are discriminably different.

4. An information storing and emitting device, including, reference means for providing a sequence of signals having progressive increases in amplitude, an information storing portion including a plurality of saturable magnetic cores and means magnetically coupled to the cores for producing magnetic flux to obtain signals having increases in amplitude in a pattern dependent upon the information being stored, and sensing means for detecting any difference between the amplitudes of corresponding signals from the reference means and the information storing portion to produce a sequence of output signals representing the stored information.

5. An information storing and emitting device, including, a reference portion including a first series of magnetic cores and means magnetically coupled to the cores to produce magnetic flux for saturating the cores, the cores in the first series having characteristics for producing progressive increases in the flow of current for the saturation of each core, an information storing portion including a second series of magnetic cores and means magnetically coupled to the cores to produce magnetic flux for saturating the cores, the cores in the second series having characteristics for producing increases in the saturating current in a particular pattern dependent upon the stored information, and means for sensing any differences in the signals produced by the reference and information portions to provide signal indications digitally representing the information stored in the member.

6. An information storing and emitting device, including, means for providing a sequence of clock signals; a reference portion including a first plurality of saturable magnetic cores disposed in telescopic relationship and having flux travel paths of progressively increasing length, and a winding connected to the signal means and magnetically coupled to the first plurality of cores for the production of signals of progressively increasing amplitude upon the introduction of successive clock signals; an information storing portion including a second plurality of saturable magnetic cores disposed in telescopic relationship and having flux travel paths increasing in length in a particular pattern dependent upon the information being stored, and a winding connected to the signal means and magnetically coupled to the second plurality of cores for the production of signals increasing in amplitude in the particular pattern upon the introduction of successive signals; and sensing means for detecting any difference in the amplitudes of the signals from the reference portion and the information storing portion upon the occurrence of each clock signal to produce a plurality of signals representing the stored information in digital form.

7. An information storing and emitting device, including means for providing a sequence of clock signals, reference means for producing a sequence of signals of progressively increasing amplitude upon the occurence of successive clock signals, an information storing portion including a plurality of magnetic cores disposed in co-planar relationship and having magnetic field strength requirements increasing in a particular pattern dependent upon the information being stored and including a winding disposed in magnetic proximity to the cores and connected in an electrical circuit with the signal means to produce a sequence of signals having amplitudes increasing in the particular pattern upon the occurence of successive clock signals, and sensing means responsive to any differences in amplitude between simultaneously occuring signals from the reference means and the information storing portion to produce a sequence of output signals representing the stored information in digital form.

8. In combination, a plurality of magnetic cores disposed in telescopic relationship and having substantially rectangular response characteristics for the production of flux with saturating intensities of positive or negative polarities in the different cores in a pattern dependent upon the information to be retained in the cores, each core being formed to provide for the travel of magnetic flux in a closed loop having a different length relative to that of the other cores in the plurality, and winding means coupled magnetically to the cores in the plurality to receive signals of a particular polarity for the production of a plurality of successive output signals in accordance with the prior saturation of the cores in the plurality with that polarity of flux or the opposite polarity of flux.

9. In combination, a plurality of magnetic cores each providing a closed loop for the passage of magnetic flux, each core having a closed loop of different length relative to that of the other cores to provide travel paths having a progressive relationship for the different cores and each core having a substantially rectangular relationship of flux vs. current for the saturation of the cores with fluxes of positive or negative polarities upon the application of a particular amount of volt-seconds to the cores and for the saturation of the different cores with fluxes of positive or negative polarities in accordance with the pattern of information to be stored in the cores, the different cores in the plurality being disposed in telescopic relationship in accordance with the progressively increasing lengths of their flux travel paths, and a winding wrapped around the cores to produce a sequence of signals in accordance with the magnetic information in the cores having flux travel paths of progressively increasing length as represented by the fluxes of saturating intensities and of positive or negative polarities in the different cores.

10. In combination, a plurality of co-planar magnetic cores disposed in enveloping relationship to one another to provide closed flux paths of progressive length in successive cores in the plurality, each core being provided with substantially rectangular response characteristics of flux vs. current to become saturated with fluxes of positive or negative polarities upon the application to the core of a particular amount of volt-seconds directly related to the length of the core and to become saturated with fluxes of positive or negative polarities in accordance with information to be stored in the cores, each core being disposed to carry magnetic information in magnetic isolation to adjacent cores in the plurality, and winding means magnetically coupled to the plurality of cores to receive successive clock signals for the production of output signals or lack of production of output signals in a sequence related to the prior saturation of the progressive cores in the plurality with fluxes of positive or negative polarities.

11. The combination as set forth in claim 10 in which the cores are disposed on nonmagnetic rings positioned in telescopic relationship to one another and in which the winding means is a single winding looped around all of the magnetic cores.

References Cited in the file of this patent

FOREIGN PATENTS 3,461 of 1873 Great Britain ---------- Oct. 24, 1873